United States Patent [19]

Morris

[11] Patent Number: 4,883,081

[45] Date of Patent: Nov. 28, 1989

[54] FLOW AND SEISMIC SENSITIVE SAFETY VALVE FOR GASEOUS FLUIDS

[76] Inventor: Antone W. Morris, P.O. Box 208, Point Reyes, Calif. 94956

[21] Appl. No.: 334,172

[22] Filed: Apr. 6, 1989

[51] Int. Cl.$^4$ ............................................. F16K 17/36
[52] U.S. Cl. ..................................... 137/39; 137/460; 251/65
[58] Field of Search ........................... 137/38, 39, 460; 251/65

[56] References Cited

U.S. PATENT DOCUMENTS

| | | | |
|---|---|---|---|
| 4,207,912 | 6/1980 | Ichikawa | 137/39 |
| 4,640,303 | 2/1987 | Greenberg | 137/38 |
| 4,785,842 | 11/1988 | Johnson | 137/38 |

FOREIGN PATENT DOCUMENTS

| | | | |
|---|---|---|---|
| 163778 | 10/1982 | Japan | 137/38 |
| 13273 | 1/1983 | Japan | 137/38 |

*Primary Examiner*—Robert G. Nilson

[57] ABSTRACT

A vibration and flow sensitve safety valve for gaseous fluids using a sphere of ferrous material as a valve plug, the ball being held in a sensitive, suspended condition positioned above its valve seat, by a permanent magnet. The magnetic attraction is such that a significant tremor or a significant pressure drop below the ball resulting from excessive flow through the venturi gap between the ball and its valve seat will dislodge the ball, allowing it to drop and plug the valve passage.

6 Claims, 1 Drawing Sheet

4,883,081

FLOW AND SEISMIC SENSITIVE SAFETY VALVE FOR GASEOUS FLUIDS

BACKGROUND OF THE INVENTION

This invention is in the field of automatic safety shut-off valves, which are triggered by an earthquake or by excessive flow through the valve, as in th case of a line break.

The natural phenomenon of earthquakes can destroy structures and the aftermath almost always results in great loss by fires fed by uncontrolled fuels spreading from ruptured conduits and overturned appliances.

There are valves of many types that respond to horizontal vibration; some are very complex, some require precise leveling, most have no means of manual closing, some have very complex resetting methods, and none respond to both vibration, as in an earthquake and excessive fluid flow, as in the case of a line break.

OBJECTS OF THE INVENTION

It is the primary object of this invention to provide a valve for blocking the discharge of flammable fluids into residential and public structures the instant a seismic shock occurs.

It is another object of this invention to provide a valve that will respond to abnormally high flow velocity to block flow of gaseous fluids as a protection against the danger arising from a downstream line break or personnel error.

It is another object of this invention to provide a means for instant manual closure without special tools or skill.

A further object of this invention is to provide means of resetting the valve without tools or partial disassembly.

Still another object of this invention is to provide a safety valve of rugged and simple construction using a minimum of moving parts resulting in maximum reliability.

Another object of this invention is to provide a conduit mounted valve that does not require precise leveling.

Is is another object of this invention is to provide a valve with means to adjust its sensitivity to both flow parameters and seismic tremors so that closure of the valve will be triggered when pre-set levels are exceeded.

Other objects and advantages of this invention will become apparent from the following invention, particularly when read in conjunction with the accompanying drawing.

SUMMARY OF THE INVENTION

This invention relates to a normally open, seismic sensitive valve, comprising a valve body wherein a movable valve element is essentially controlled by the positioning of an axially movable cylindrical magnet. Movement of the magnet is guided by a gland in the upper valve body, which is coaxial with an annular valve seat in the lower valve body. The magnet is moved axially by pressing a manual reset button on a protruding end of the magnet and is retracted by an arming spring to limits imposed by a snap ring and a spacer, bearing against the upper valve body. Downward axial movement of the cylindrical magnet, causing it to engage the previously seated ball element, will engage and attract the ball and lift it from its seat. Then, when the reset button is released, the arming spring will then retrieve magnet and ball valve into armed condition above the valve seat.

This safety valve incorporates a second and latent function in that it can react to an abnormal flow rate, as from a downstream break or personnel error, to close the valve. A venturi formed by the interaction between the armed ball valve and the contoured face of the valve seat effectively reduces the pressure under the valve element so that at very high flow, the pressure drop is sufficient to overcome the magnetic retention, and seat the valve. Adjustment of the venturi gap can be accomplished by spacers at the interfacing of the valve bodies; said gap is a means to set maximum flow parameters.

This valve has a manual closing feature as well; a sharp blow on the reset button will dislodge the ball element and instantly close the valve.

DETAILED DESCRIPTION OF A PREFERRED EMBODIMENT

Figure 1:
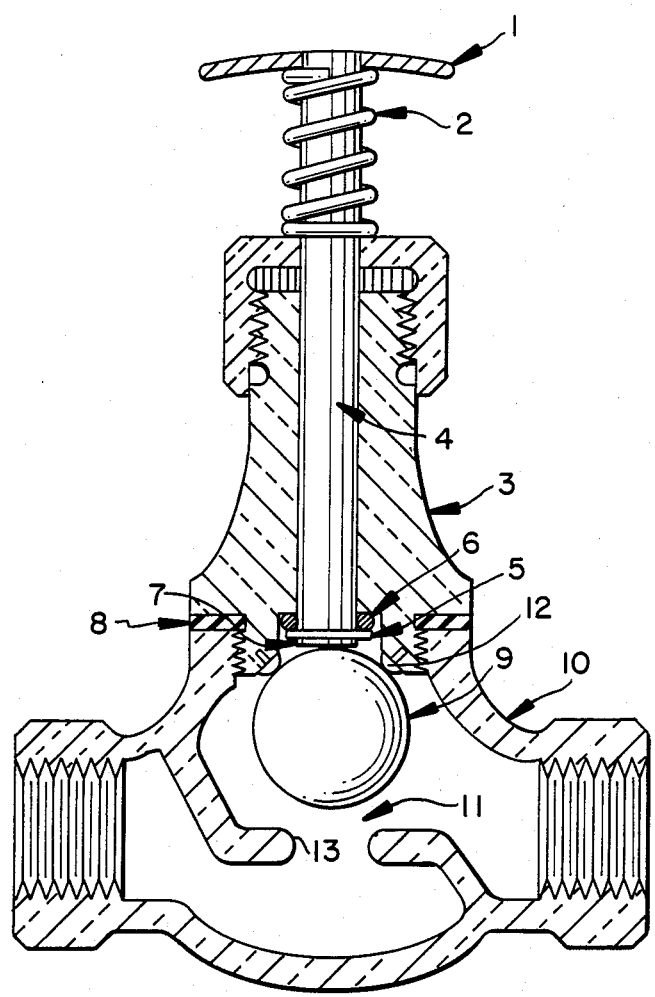
FIG. 1 is a vertical section view of a valve embodying features of this invention.

Referring more particularly to the drawing the valve body comprises an upper segment 3, which is severable from the lower body 10 for purposes of assembly of internal parts. The valve body 3, 10 is of a non-magnetic material, such as brass or a suitable rigid plastic. The valve ball 9 is of a ferrous material and the space 11 between the ball 9 and an annular seat 13 forms a venturi restriction contoured for smooth flow. The distance 11 between the valve ball 9 in its armed position, as shown, and the annular valve seat 13 is adjusted and set by means of a spacer gasket 8. This spacing affects the venturi attraction of valve ball 9 so that flow in excess of normal will result in a pressure drop that will trigger the valve to its closed mode. The actuator button 1, which is an integral part of the magnet 4 serves to retain the arming spring 2, as well as to actuate the magnet 4.

In FIG. 1, the valve element or ball 9 is shown in its armed condition with the magnet 4 being held retracted by the arming spring 2. This creates and sets a gap 7 between the permanent magnet 4 and the back seated valve ball element 9, thereby establishing a precise and sensitive magnetic attraction between the magnet 4 and the ball valve element 9 such that it will be overcome by a seismic shock or by a substantial pressure drop below the ball 9 resulting from excessive flow through the venturi gap 11. When this magnetic attraction is so overcome, the valve ball 9 will be released from the armed position shown to lodge in seat 13 and block further flow through the valve 3, 10.

Magnetic sensitivity is adjustable by selection of a suitable spacer, such as a selected cross section, backed by spacing washers 5 above a snap ring. This adjustment fixes the size of the gap 7 between the cylindrical magnet 4 and the magnetically susceptible ball valve element 9 to adjust the magnitude of the magnetic attraction between them.

Rearming of the valve is accomplished by pressing the button to compress the spring fully so that the magnet 4 will engage the valve ball 9 while seated at 13. Then by gradually releasing the button 1, the valve ball may be raised to its armed position, shown backseated against four corrosion-resistant pegs 12. The pegs 12 are provided to protect the valve element 9 and to minimize sitcking caused by gums and tars present in most gases.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. A flow and shock sensitive self-closing safety valve for a gas pipeline comprising:
   a valve body of a non-magnetic material having inlet and outlet flow passageways and an annular, generally horizontal valve seat between them;
   a valve element of a magnetic material above said valve seat;
   a permanent magnet in said valve body above said valve element and movable therein toward and away from said valve seat to adjust the magnetic attraction between said magnet and said valve element; and
   spring means biasing said magnet away from said valve element, said spring means being overcome to enable movement of said magnet to engage said valve while on said valve seat.

2. The safety valve defined by claim 1 including:
   stop means to limit movement of said valve element away from said valve seat; and
   means for setting the displacement of said stop means from said valve seat so that with said valve element suspended in engagement with said stop means there is a narrow venturi gap between said valve element and said valve seat.

3. The safety valve defind by claim 1 including:
   means limiting the retracting movement of said magnet to establish the magnetic gap between said magnet and said valve element with said valve element in engagement with said stop means.

4. The safety valve defined by claim 3 wherein:
   said magnet is in the nature of a generally vertical, cylindrical stem movable axially in and protruding from said valve body.

5. The safety valve defined by claim 4 wherein:
   the magnetic gap may be set so that said valve element may be dislodged from said magnet by a sharp blow on the protruding end of said stem.

6. The safety valve defined by claim 4 wherein:
   the magnetic may be set so that said valve element may be dislodged by a pressure drop below it resulting from an excessive rate of flow below it.

* * * * *